United States Patent [19]
Kozuki et al.

[11] Patent Number: 5,089,919
[45] Date of Patent: Feb. 18, 1992

[54] TRACKING CONTROL INFORMATION SIGNAL RECORDING DEVICE

[75] Inventors: Susumu Kozuki, Tokyo; Kenichi Nagasawa, Kanagawa; Hiroo Edakubo, Tokyo; Unichi Sato; Nobutoshi Takayama, both of Kanagawa, all of Japan

[73] Assignee: Canon Kabushiki Kaisha, Tokyo, Japan

[21] Appl. No.: 671,663

[22] Filed: Mar. 19, 1991

Related U.S. Application Data

[60] Continuation of Ser. No. 361,708, May 31, 1989, abandoned, which is a continuation of Ser. No. 940,015, Dec. 10, 1986, abandoned, which is a division of Ser. No. 804,350, Dec. 3, 1985, Pat. No. 4,638,390.

[30] Foreign Application Priority Data

Dec. 4, 1984 [JP] Japan ................. 59-256760

[51] Int. Cl.⁵ ............... G11B 15/18; G11B 5/584
[52] U.S. Cl. ...................... 360/74.4; 360/3; 370/27; 370/69; 370/77.14; 370/13; 369/47
[58] Field of Search ............... 360/13, 14.1, 18, 27, 360/60, 74.1, 74.4, 73.06, 73.07, 77.14, 77.15, 69; 369/43, 47, 50

[56] References Cited

U.S. PATENT DOCUMENTS

| | | | |
|---|---|---|---|
| 4,520,406 | 5/1985 | Suzuki et al. | 360/74.4 |
| 4,533,963 | 8/1985 | Nakano et al. | 360/14.1 |
| 4,691,251 | 9/1987 | Ookawa et al. | 360/14.1 |

Primary Examiner—Aristotelis Psitos
Assistant Examiner—Steven R. Garland
Attorney, Agent, or Firm—Toren, McGeady & Associates

[57] ABSTRACT

An information signal recording apparatus arranged to form a recording track on a recording medium by recording an information signal on the recording medium, in which the information signal is recorded on the recording medium in such state that a first tracking control signal, for effecting a first tracking operation during reproduction, is superimposed thereon, in the case where a stop of the recording track forming operation is not instructed, and the information signal is recorded on said recording medium in such state that a second tracking control signal, for effecting a second tracking operation during reproduction, is superimposed on the information signal, depending upon a timing when the stop of the recording track forming operation is instructed, whereby a position where the first tracking operation becomes impossible on the way of effecting the first tracking operation during reproduction is detected, so that a position of the step of the recording track forming operation on the recording medium can be easily detected.

9 Claims, 6 Drawing Sheets

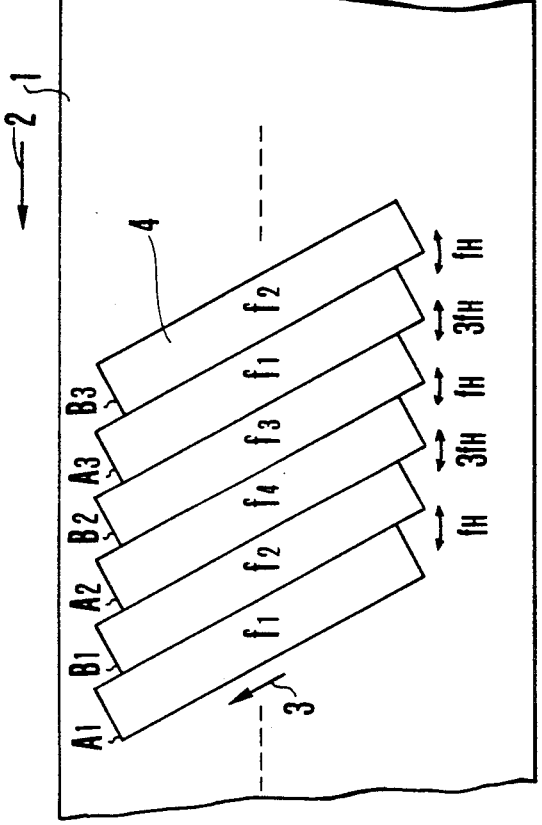
F I G.1
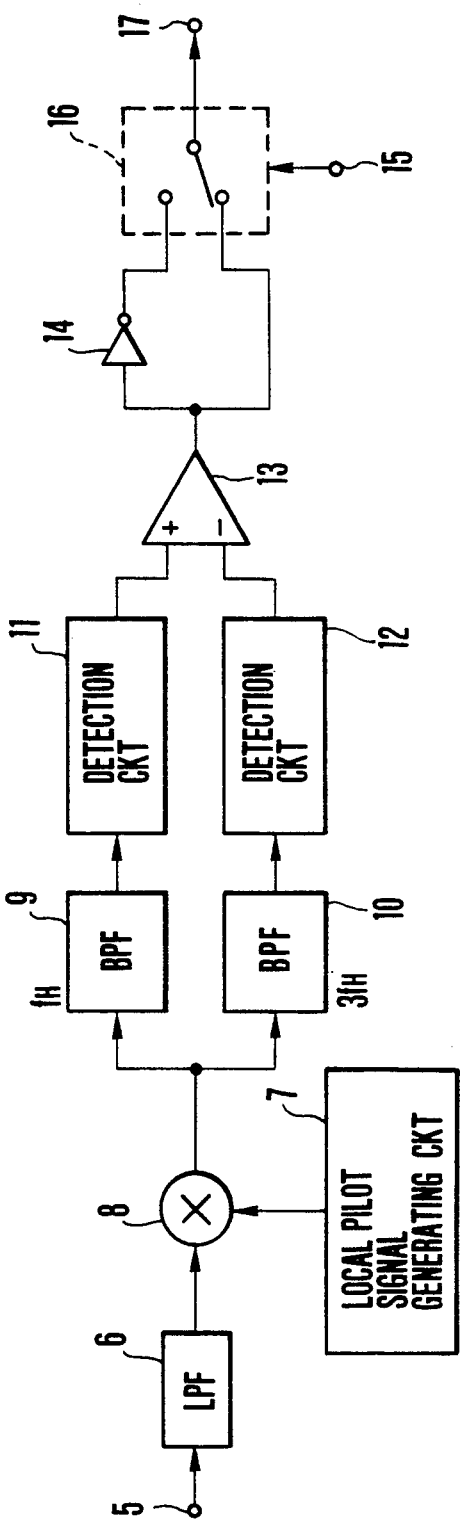
F I G.2

TRACKING CONTROL INFORMATION SIGNAL RECORDING DEVICE

This is a continuation application of Ser. No. 07/361,708, filed May 31, 1989, now abandoned; which in turn is a continuation application of Ser. No. 06/940,015, filed Dec. 10, 1986, now abandoned; which in turn is a divisional application of Ser. No. 06/804,350, filed Dec. 3, 1985; and which in turn issued as U.S. Pat. No. 4,638,390.

BACKGROUND OF THE INVENTION

1. Field of the Invention

This invention relates to a recording apparatus for recording an information signal on a record bearing medium.

2. Description of the Prior Art

Known recording and/or reproducing apparatuses of the above-stated kind include video tape recorders (hereinafter referred to as VTR's) of a rotary two-head type which is arranged, for example, to perform the so-called four-frequency pilot type tracking control. In the following description, the VTR of this kind is taken up by way of example.

In carrying out the so-called jointed recording in which a new video signal is continuously recorded on a magnetic tape without leaving any blank part after the end of a previously recorded video signal, the VTR's of this kind have employed the following method: First, when an instruction for a halt is issued, the magnetic tape is immediately wound backward to a predetermined extent (or for a given period of time "to"). Then, the tape comes to a stop. After that, when the tape is released from the stopping action, it is allowed to travel at a normal speed with the VTR shifted to a reproducing mode under tracking control. Then, after the tape is allowed to travel forward to an extent a little shorter than the above-stated backward winding extent, i.e. after the lapse of a period of time "t1" which is shorter than the period "t0", a new video signal is recorded from a part at which a recording track begins in synchronism with a head switch-over signal.

However, the conventional VTR which is arranged to be capable of performing the jointed recording in the above-stated manner has represented the following problems: First, during a period of time corresponding to a difference between the periods "t0" and "t1", there remains a portion of the previously recorded signal. Therefore, the new signal comes to be overlapped or superimposed on this portion of the previous record. As a result, the quality of a reproduced picture deteriorates in this part. Next, since the VTR of the kind performing four-frequency type tracking control is generally arranged to performed so-called azimuth overlapped writing, the locus of tracing performed by a head at the time of reproduction deviates from that of tracing performed by a head in recording. Therefore, with the tape wound backward after the halt as mentioned above, the arrangement to record a new video signal with tracking made in the same manner as the reproduction tracking made at the time of the halt would result in the irregular width of tracks formed in the joint part. Therefore, when the jointed record is played back across the jointed part, tracking cannot be stably accomplished at that part.

To solve these problems, there have been contrived various methods. In one of such methods, a VTR is arranged to lessen the overlapped recording part. In another, a VTR is arranged to compensate for the deviation of the tracing locus of the head. These methods, however, necessitate additional arrangement of high precision control means. Therefore, each of these methods has resulted in a complex circuitry, which has hindered reduction in size and cost of the apparatus.

SUMMARY OF THE INVENTION

It is an object of this invention to provide a recording apparatus which is capable of indicating the end part of a record on a record bearing medium without necessitating any complex arrangement for that purpose.

It is another object of this invention to provide a recording apparatus which is capable of indicating a stopped part of a recording operation on a record bearing medium without producing any additional signal for indicating.

It is a further object of this invention to provide a recording apparatus which is capable of detecting a part at which a recording operation is stopped on a record bearing medium and to automatically switch one operating mode over to another without necessitating any complex arrangement.

It is a still further object of this invention to provide a recording apparatus which is capable of stopping a recording operation after a predetermined number of recording tracks are formed on a record bearing medium without necessitating any complex arrangement for that purpose.

Under these objects, a recording apparatus arranged according to this invention to record an information signal on a record bearing medium comprises: recording means for recording the information signal on the medium; instruction means for producing an instruction to stop a recording operation; stopping means for causing, in response to the instruction of the instruction means, the recording means to stop recording; pilot signal generating means for generating pilots signals having different frequencies from each other in a first generating pattern; control means for controlling the pilot signal generating means to generate the pilot signals in a second generating pattern in response to the instruction of the instruction means; and superimposing means for superimposing upon the information signal the pilot signals generated by the pilot signal generating means.

The above and other related objects and features of this invention will become apparent from the following detailed description of embodiments thereof taken in connection with the accompanying drawings.

BRIEF DESCRIPTION OF THE DRAWINGS

FIG. 1 is an illustration of magnetized recording tracks formed by a VTR of the type performing tracking control by the four-frequency pilot method.

FIG. 2 is a block diagram showing the essential parts of a reproduction circuit arranged to obtain a tracking error signal.

DETAILED DESCRIPTION OF THE PREFERRED EMBODIMENTS

Figure 3A:
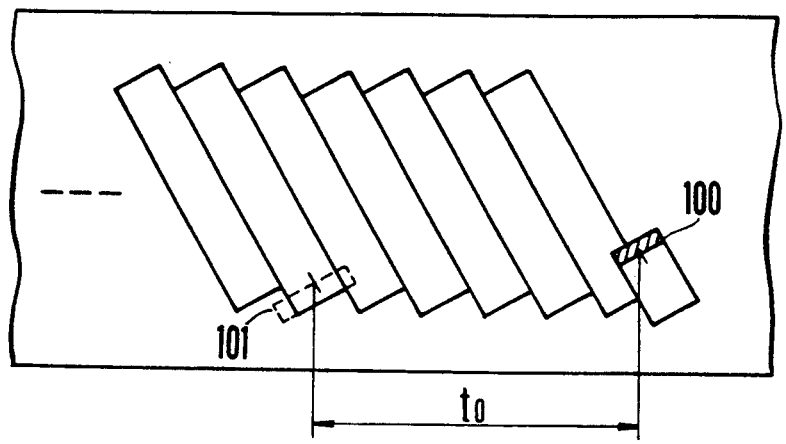
FIGS. 3A, 3B and 3C are illustrations showing the shortcoming of the jointed recording performed by the conventional VTR.

The details of this invention will be understood from the following description of a preferred embodiment thereof: First, let us briefly describe the manner in which a tracking control signal is obtained by the four-frequency pilot method. FIG. 1 of the accompanying drawings shows the magnetized recording tracks formed by a VTR of the kind performing tracking control in accordance with the four-frequency pilot method. FIG. 2 is a block diagram showing the essential parts of a reproduction circuit arranged to obtain the tracking error signal.

Referring to FIG. 1, the illustration includes a magnetic tape 1 and an arrow 2 which indicates the travelling direction of the tape 1. Recording tracks A1, B1, A2, B2, —are formed with recording performed by heads A and B which have different predetermined azimuth angles. An arrow 3 indicates a direction in which scanning is performed by these heads. In each of recording track 4, one of pilot signals having four different frequencies f1 to f4 is recorded along with a video signal. The pilot signals are thus superimposed on a video signal one after another for every field portion of the record (one in every track). The recording sequence of these pilot signals is, for example, as follows as shown in FIG. 1: The track A1 has the pilot signal of the frequency f1 which is, for example, $102.5 \text{ KHz} \approx 6.5 \text{ fH}$ (fH representing the frequency of a horizontal synchronizing signal). The track B1 has the pilot signal of the frequency f2 which is, for example, $118.9 \text{ KHz} \approx 7.5 \text{ fH}$. The track A2 has the pilot signal of the frequency f4 which is, for example, $165.2 \text{ KHz} \approx 10.5 \text{ fH}$. The track B2 has the pilot signal of the frequency f3 which is, for example, $148.7 \text{ KHz} \approx 9.5 \text{ fH}$. The frequency difference between the pilot signals recorded in adjacent recording tracks is arranged to be either fH or 3 fH as shown in FIG. 1. Futher, when the head is scanning a track Ai (i: 1, 2, 3, —), the frequency difference between the pilot signal of the track and that of another track which is located next on the right-hand side of the track Ai as viewed on the drawing is always fH while the frequency difference between the pilot signal of the track Ai and that of another track on the left-hand side thereof is always 3 fH. When the head is scanning a track Bi (i: 1, 2, 3, —) on the other hand, the frequency difference between the pilot signal of the track and that of another track on the right-hand side is always 3 fH while the frequency difference between the pilot signal of the track Bi and that of another track on the left-hand side is always fH.

Further, since the pilot signals of the frequencies f1 to f4 are relatively low frequency signals, the head can reproduce the pilot signals of the adjacent tracks as cross-talks in addition to that of the track being mainly scanned even in the case of azimuth recording arrangement. In other words, assuming that the head is mainly scanning the track A2, a composite signal including components of frequencies f4, f2 and f3 is detected as the pilot signal. In case that the center of the tracing locus of the head accurately coincides with the center line of the mainly scanned track, i.e. in the case of an on-track condition, the reproduced level of the pilot signal of frequency f2 and that of the pilot signal of frequency f3 are equal to each other. The latter becomes higher than the former when the position of the head deviates from the track A2 slightly toward the track B2. The former becomes higher than the latter when the head deviates slightly toward the track B1.

To obtain the direction and the degree of deviation of the head from the mainly scanned track, difference signals of fH and 3 fH representing the frequency difference between the pilot signal of the main track and that of each of the two adjacent tracks are separated and taken out; and then the levels of the two difference signals are compared with each other.

FIG. 2 is a circuit block diagram showing the arrangement of a circuit operating in accordance with the four-frequency pilot method described above. Referring to FIG. 2, a terminal is arranged to receive an incoming reproduced signal having the pilot signals superimposed on a video signal. The reproduced signal is applied to a low-pass filter (hereinafter referred to as LPF) 6 to have the pilot signal component separated alone. A multiplier 8 is arranged to perform a multiplying operation on the separated pilot signal component and a local pilot signal generated by a local pilot signal generating circuit 7. The local pilot signal is arranged to have the same frequency as that of the pilot signal recorded in the mainly scanned track. As mentioned in the foregoing with reference to FIG. 1, in case that the track A2 is being mainly scanned, the output of the LPF 6 includes components of frequencies f2, f4 and f3. Then, the frequency of the local pilot signal in this instance is f4. Accordingly, the multiplier 8 produces a signal having a frequency of a sum of and difference frequencies f2, f4 and f3 and the frequecy f4 in this instance. A band-pass filter (hereinafter referred to as BPF) 9 is arranged to take out the frequency component fH from the sum and difference signal. Another BPF 10 is arranged to take out the frequency component 3 fH from the signal. The outputs of the BPF's are supplied to detection circuits 11 and 12 for detection and rectification.

Following this, the signal componens fH and 3 fH are supplied to a level comparator 13. The circuit 13 then produces a signal corresponding to the level difference between these signal components. More specifically, when the reproduced level of the signal component fH is higher than that of the signal component 3 fH, a positive potential corresponding to the level difference is taken out. In the event of a converse relation, a negative potential is taken out. This arrangement thus gives a signal indicative of both the degree and the direction of the deviation of the head from the track. Therefore, this signal is usable as a tracking error signal.

Then, since the relation of the deviating direction of the head to the tracking error signal for the track Ai conversely takes place in the case of the track Bi as described in the foregoing, a switching circuit 16 is arranged to selectively allow the output of the comparison circuit 13 to pass through an inverting amplifier 14 in response to a head switch-over signal 15.

Figure 3B:
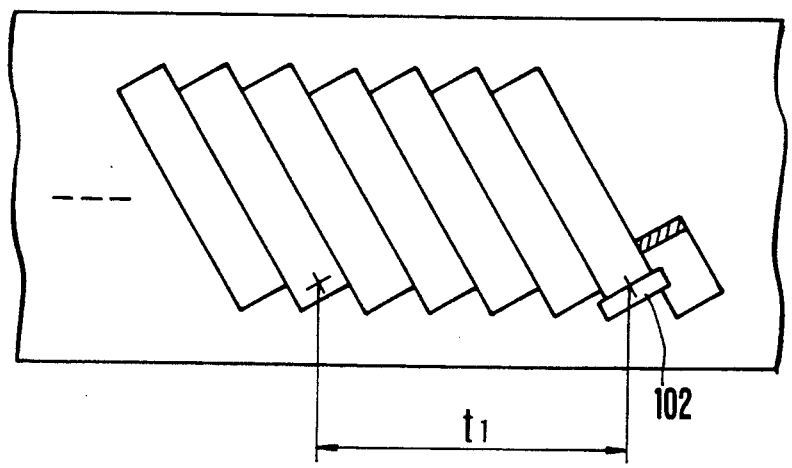
Figure 3C:
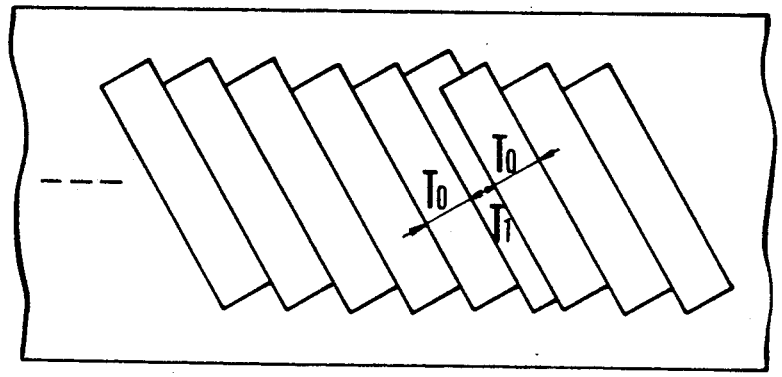

FIGS. 3A, 3B and 3C show the shortcoming of the conventional jointed recording arrangement. Assuming that a halt or stop instruction is produced to temporarily stop recording when either the head A or the head B (or a head 100) is recording halfway for one field portion of the signal as shown in FIG. 3A, the tape is then wound backward to a predetermined extent "t0" and the head 100 comes back to a point 101.

After that, there obtains a reproducing mode with the halt mode cancelled. Then, the tape is allowed to travel at a normal speed under tracking control. There obtains a recording mode in synchronism with a head switch-over signal produced after the lapse of a period of time t1 (shorter than the period of time t0). The head then records a new signal at a point 102 indicated in FIG. 3B. Before arrival at this point 102, the head has traced the tape across three tracks under tracking control. Therefore, if the recording mode obtains immediately under that condition, there would be formed a recording track of width T1 which is narrower than the width T0 of other recording tracks as shown in FIG. 3C. This has been the shortcoming of the conventional arrangement for jointed recording.

Figure 4:
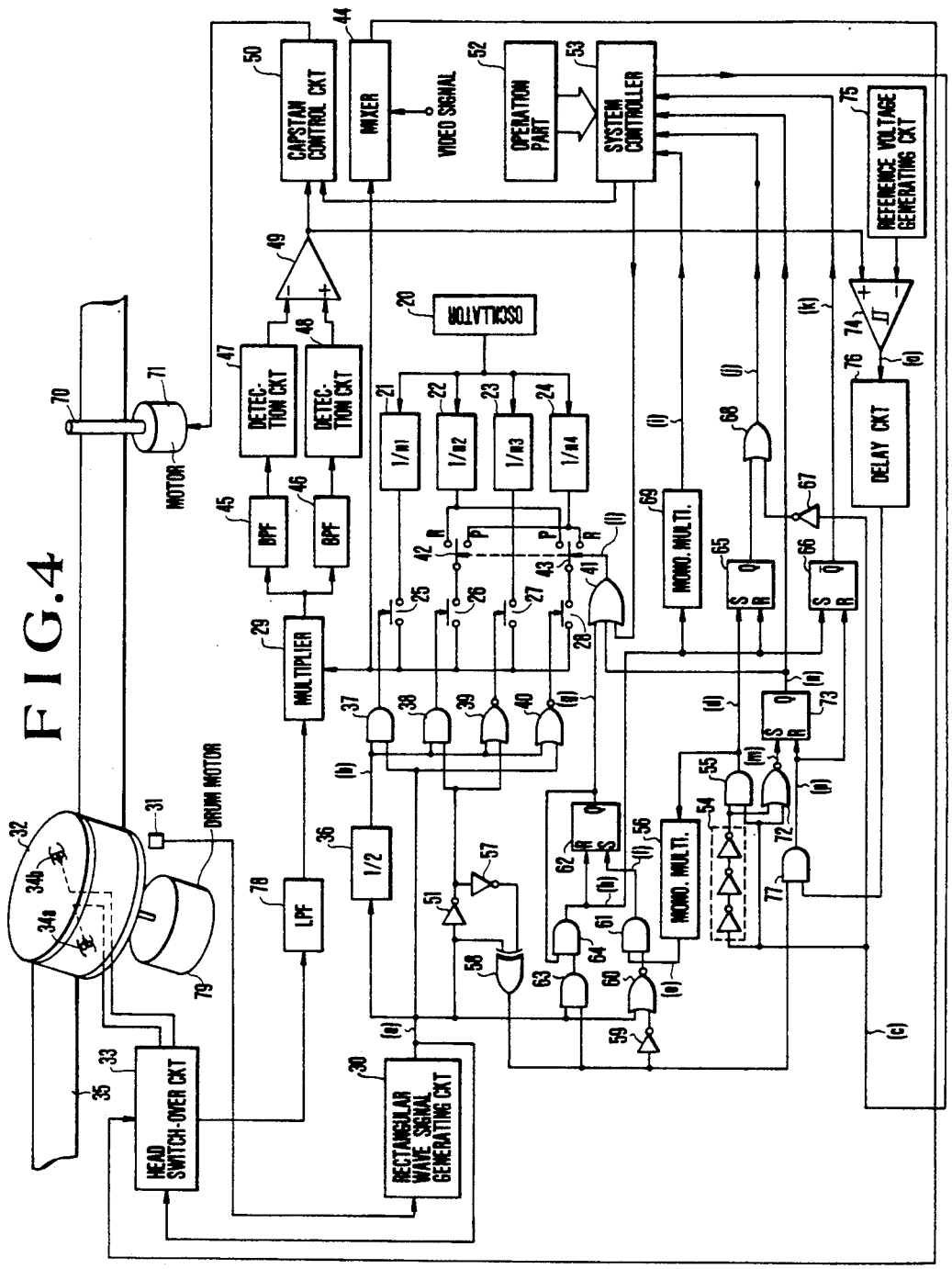
FIG. 4 is a diagram showing the arrangement of essential parts of a VTR embodying this invention as an embodiment thereof.

A VTR which is arranged according to this invention as an embodiment thereof is arranged as shown in FIG. 4 in a circuit diagram. FIGS. 5A to 5E show the operation of this embodiment. FIG. 6 shows the wave forms of signals obtained at various parts of the circuit arrangement of FIG. 4. The details of this embodiment will be described below with reference to these drawings:

Referring to FIG. 4, an oscillator 20 produces a reference signal, which is then frequency divided by 1/n1, 1/n2, 1/n3 and 1/n4 by means of frequency dividers 21, 22, 23 and 24. These frequency dividers 21, 22, 23 and 24 then produces signals of frequencies f1, f2, f4 and f3. One of these signals of frequencies f1, f2, f4 and f3 is selectively supplied to a multiplier 29 with one of switches 25, 26, 27 and 28 turned on. Meanwhile, a rectangular wave signal generating circuit 30 is arranged to produce a rectangular wave signal which is as shown at a part (a) in FIG. 6. This rectangular wave signal (a) alternately becomes high and low levels at every one-field period (at intervals of 1/60 sec) according to the rotation phase of a rotary drum 32 detected by a detector 31. This signal is arranged to be used also as a head switch-over signal HSW and is thus supplied to a head switch-over circuit 33. The magnetic head operation is thus switched over between heads 34a and 34b. The inversion period of this signal HSW corresponds to a period of time during which the magnetic head 34a or 34b traces one recording track on the magnetic tape 35.

The signal HSW or (a) is frequency divided by ½ by a ½ frequency divider 36 to obtain a signal (b) as shown at a part (b) in FIG. 6. As a result of this, each of AND gates 37 and 38 and NOR gates 39 and 40 produces a high level signal one after another at every one-field period (a period of time during which each of the magnetic heads 34a and 34b traces one recording track).

Meanwhile, as will be described in detail later, the output level of an OR gate 41 becomes low for normal recording and high for normal reproduction. When the output of this OR gate 41 is at a high level, the connecting positions of switches 42 and 43 are on their sides P. They are on the other sides R when the output of the OR gate 41 is at a low level. During normal recording, therefore, one of pilot signals of the frequencies f1, f2, f3 and f4 is supplied to a mixer 44 at every one-field period in a sequence of rotation of f1, f2, f4 and f3. The mixer mixes the pilot signal with an incoming video signal. The output of the mixer 44 is recorded on a magnetic tape 35 by the magnetic heads 34a and 34b. Further, during normal reproduction, signals of frequencies f1, f2, f3 and f4 are supplied one after another in rotation to a multiplier 29 in the sequence of f1, f3, f4 and f2 as local pilot signals. Then, a reproduced signal obtained from the magnetic heads 34a and 34b is supplied to the multi-plier 29 via the head switch-over circuit 33 and a low-pass filter 78. The reproduced signal and the local pilot signal are subjected to a multiplying operation performed by the multiplier 29.

In case that a normal reproducing operation is designated at an operation part 52 and a reproducing instruction signal of a high level is supplied to the OR gate 41 from a system controller 53, if the frequencies of the pilot signals recorded in the main tracks are in the sequence of f1, f2, f4 and f3, the frequencies of the local pilot signals supplied to the multiplier 29 are in the sequence of f1, f3, f4 and f2. Therefore, in this instance, the frequency difference between each of the local pilot signals and the pilot signal recorded in the track preceding the main track is always 3 fH while the frequency difference between the local pilot signal and the pilot signal of the track succeeding the main track is always fH. These frequency components fH and 3 fH are separated by means of band-pass filters 45 and 46 and the detection circuits 47 and 48. Then, a comparison circuit 49 produces a signal corresponding to a difference between the outputs of the detection circuits 47 and 48. The signal from the comparison circuit 49 is employed as a tracking error signal as it is and is supplied to a capstan control circuit 50. The oscillator 20, frequency dividers 21, 22, 23 and 24, the AND gates 37 and 38, the NOR gates 39 and 40, the ½ frequency divider 36 and the inverter 51 jointly form the local pilot signal generating circuit 7 shown in FIG. 2.

In the event of jointed recording, the embodiment operates as follows: When a normal recording operation is designated at the operation part 52, a recording instruction signal which is at a low level is supplied from the system controller 53 to the OR gate 41. The switches 42 and 43 are connected to their sides R. Under that condition, a stop or halt is designated at the operation part 52. The system controller 53 then produces a halt instruction signal which remains at a high level while recording is brought to a stop as shown at a part (c) of FIG. 6. This signal is supplied to an OR gate 68 via a delay inversion circuit 54, an AND gate 55 and an inverter 67. The delay inversion circuit 54 and the AND gate 55 are provided for the purpose of detecting the rising edge of the recording stop instruction signal (c). An edge signal (d) which is thus obtained triggers a monostable multivibrator 56. The output of the monostable multivibrator 56 becomes a signal which remains at a high level between two fields in a manner as shown at a part (e) of FIG. 6.

Meanwhile, edge parts of the signal HSW or (a) are detected by inverters 51 and 57 and an exclusive OR circuit 58. Further, an inverter 59 and a NOR gate 60 detect only the fall edge of the signal. As a result, one edge of the signal is gated by an AND gate 61 as a pulse signal (f). This pulse signal (f) comes to set a flip-flop 62. The flip-flop 62 is reset by a next rise edge (h) of the signal HSW or (a) which is detected via AND gates 63 and 64. The flip-flop 62 then produces a signal (g) as the Q output thereof as shown at a part (g) in FIG. 6. The level of the signal (g) is at a high level for a one-field period during which the pilot signal of the frequency f2 or f3 is recorded for the first time after the recording stop instruction is produced. During that period, the level of the output (1) of the OR gate 41 is also high as shown at a part (1) in FIG. 6. Then, if the track is to be recorded with the pilot signal of the frequency f2 or f3, the frequency of the pilot signal to be recorded becomes f3 or f2.

Figure 5A:
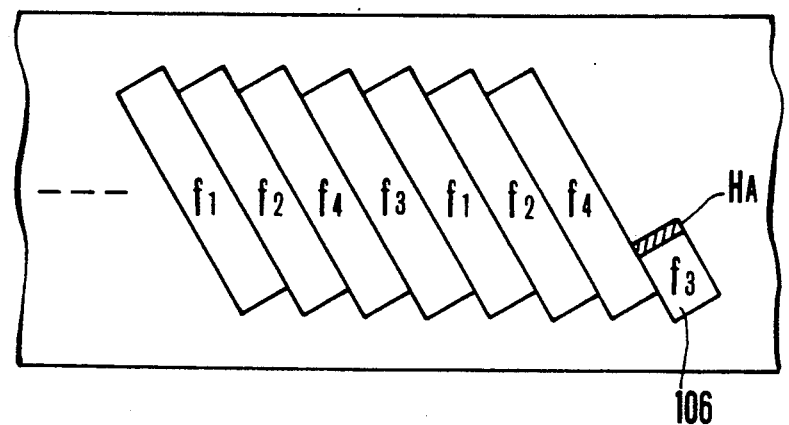
FIGS. 5A to 5E are illustrations showing the operation of the VTR of FIG. 4.
Figure 6:
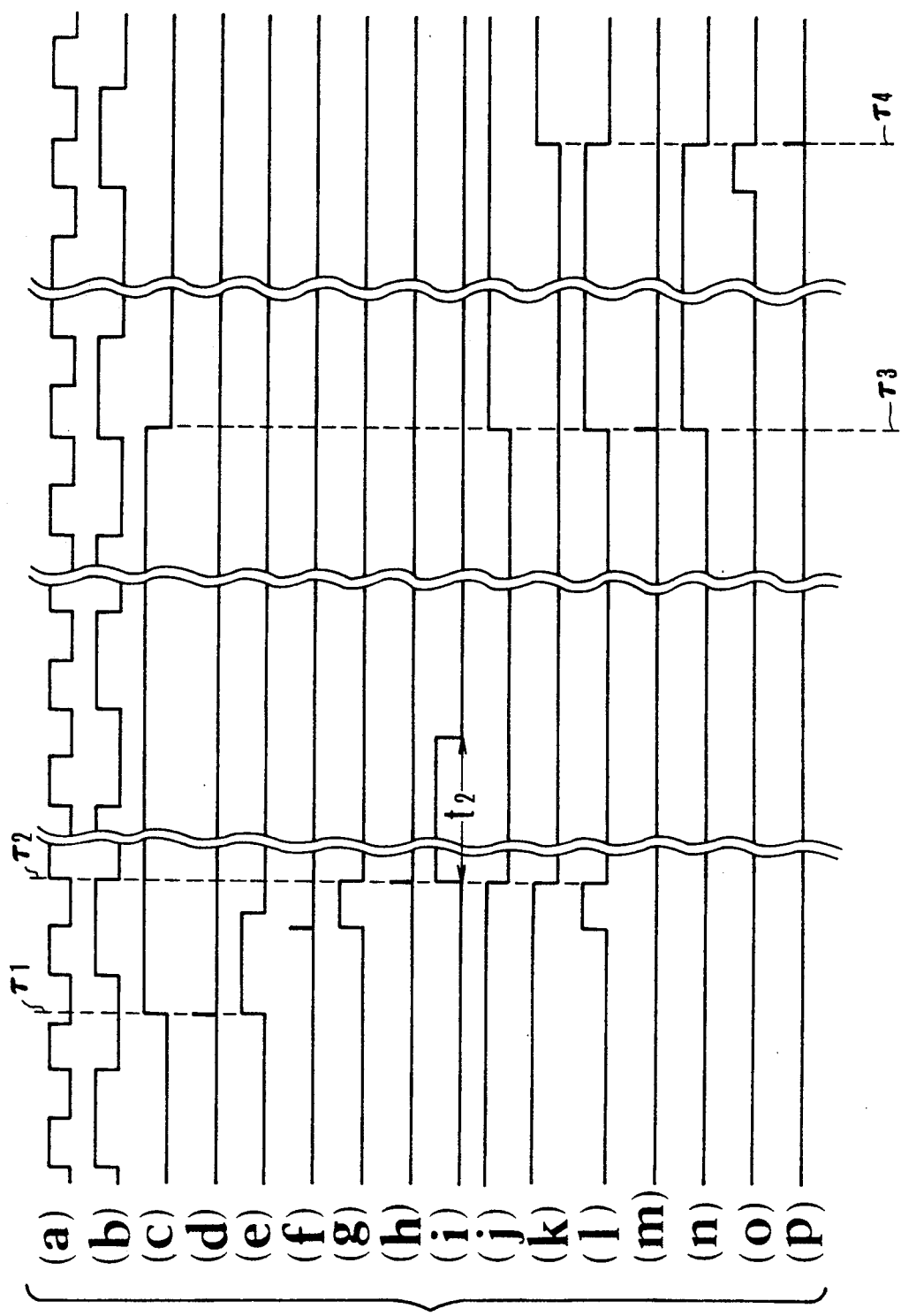
FIG. 6 is a timing chart showing the wave forms of signals produced from various parts of the VTR shown in FIG. 4.

Let us assume that a recording stop instruction is produced under a condition as represented by FIG. 5A. In other words, the recording stop instruction is produced while a head HA is in the process of tracing a track 106. In such a case, the recording operation cannot be immediately brought to a halt at that point of time (i.e. a point of time T1 shown in FIG. 6), because: an instruction signal (j) applied to the system controller 53 during the recording operation is kept at a high level with a flip-flop 65 having been set. Besides, a video signal recording instruction (k) also remains at a high level as a flip-flop 66 is not triggered.

Figure 5B:
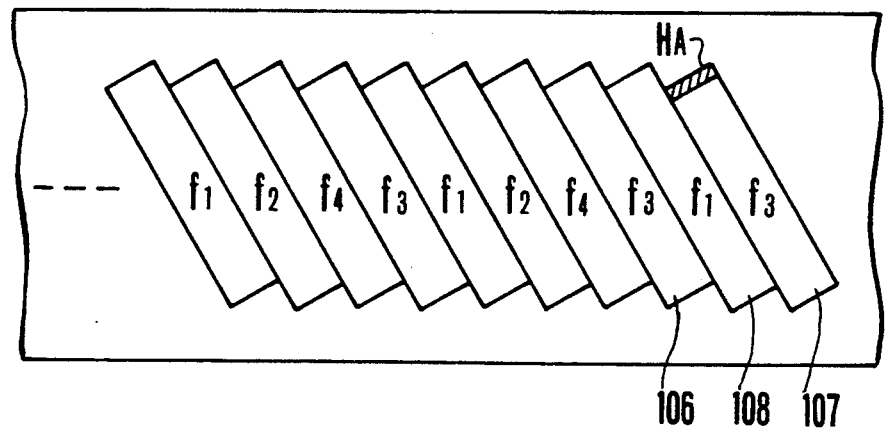

Referring to FIG. 5B, when the head HA traces a track 107, the level of the output (1) of the OR gate 41 becomes high. Therefore, both the switches 42 and 43 are connected to their sides P. Then, in place of the pilot signal of the frequency f2 which is to be recorded, the pilot signal of the frequency f3 is recorded. The recording operation then comes to a stop when the head HA comes to a position as indicated in FIG. 5B.

At this point of time (T2 in FIG. 6), the flip-flop 62 is reset. The reset pulse (h) also resets the flip-flop 65 and sets a flip-flop 66. A monostable multivibrator 69 is triggered. Then, a capstan reverse rotating instruction signal (i) which is supplied from this monostable multivibrator to the system controller 53 becomes a high level. This high level signal (i) is supplied via the system controller 53 to a capstan control circuit 50. Upon receipt of this signal, the capstan control circuit 50 controls a capstan motor 71 which is arranged to drive a capstan 70. The capstan 70 is then driven to begin to rewind (or wind backward) the magnetic tape 35. This tape rewinding action comes to a stop after the lapse of a predetermined period of time as indicated at "t2" in FIG. 6. The magnetic tape comes to a stop accordingly.

Figure 5C:
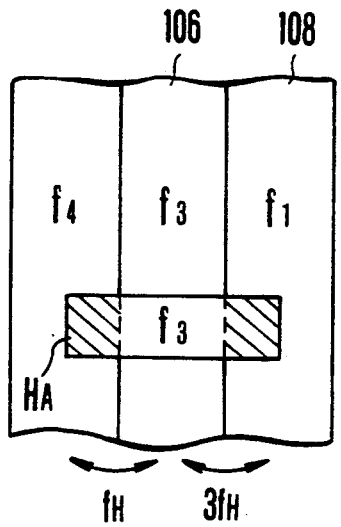
Figure 5D:
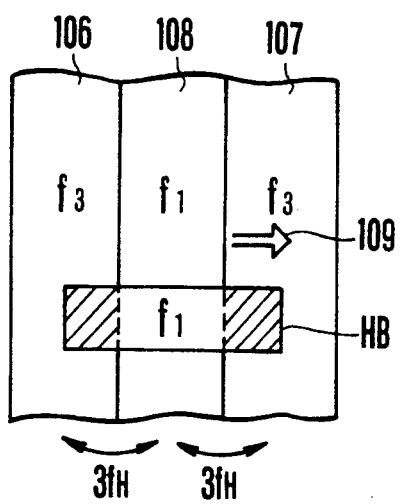
Figure 5E:
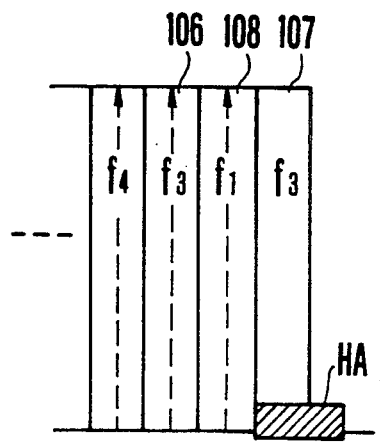

In case that the recording is to be resumed with the recording stop instruction cancelled, the embodiment operates as follows: Assuming that a recording resuming instruction is produced at a point of time T3 as shown in FIG. 6, the level of the recording stop instruction signal (c) becomes a low level. The fall edge of the signal (c) is detected by a NOR gate 72 as shown at a part (m) in FIG. 6. A flip-flop 73 is set by this. The level of the Q output (n) of the flip-flop 73 becomes high. The high level signal (n) is then supplied to the system controller 53 as a reproducing instruction signal. Further, the level of the output (1) of the OR gate 41 also becomes high. As a result, the frequency rotation sequence of the local pilot signals becomes f1, f3, f4 and f2. Then, a reproducing operation begins on the rewound (or wound back) portion of the magnetic tape. Referring now to FIG. 5C, in the record part mentioned above, the frequency component of 3 fH is obtained from a preceding track and the frequency component of fH from a succeeding track until the head comes to trace a track 106 which is located in the third place counting from the last recording track. The head HA then comes to be in an on-track state at that point of time. Referring to FIG. 5D, when the head HB traces a track 108 located second from the last track, the tracking error signal is obtained in the following manner: In this instance, frequency components of 3 fH are obtained as cross-talk components from the pilot signals recorded in both the tracks preceding and succeeding the mainly traced track. Therefore, when the head HB begins to trace the track 108, the level of the tracking error signal produced from the comparison circuit 49 of FIG. 4 suddenly rises. This urges the travelling speed of the magnetic tape to be increased to shift the position of the head HB in the direction of arrow 109 as indicated in FIG. 5D. Following this, when the head HA comes to begin to trace the last track 107, the position of one end of the head HA approximately coincides with the border line between the tracks 107 and 108.

While the head HB is mainly tracing the track 108, any abnormality of the tracking error signal is detected with the signal compared by a hysteresis comparator 74 with a reference voltage produced from a reference voltage generating circuit 75. Further, in the event of detection of any abnormality during this period, an abnormality detection signal (o) is obtained in a manner as shown at a part (o) in FIG. 6. The fall edge of this signal (o), that is, a point of time T4 (see FIG. 6) at which the tracing action on the track 108 by the head HB comes to an end is detected by an AND gate 77 which receives a signal obtained by slightly delaying the abnormality detection signal (o) via a delay circuit 76 and an edge of the signal HSW or (a) as shown at part (p) in FIG. 6.

The timing pulse (p) which is thus obtained resets the flip-flop 66 and another flip-flop 73. With these flip-flops reset, recording is resumed by bringing the reproduction of a vide signal to a stop. Since the level of the Q output (n) of the flip-flop 73 changes to a low level, the level of the output (1) of the OR gate 41 also becomes low. As a result the rotation sequence of frequencies of the pilot signals comes back to the sequence of f1→f2→f4→f3. Then, in the track 107, recording is performed with the pilot signal of the frequency f2 superimposed upon a video signal.

As obvious from the description given above, the overlapped writing part which is obtained by the VTR according to this invention is limited to only one-field portion of the video signal (one track). Besides, the width of tracks in the jointed part of the signal is unvarying. Therefore, the embodiment is capable of carrying out a continuous reproducing operation without deterioration of picture quality and unstable travel of the magnetic tape. It is another advantage of the embodiment that the above-stated advantages are attainable by just generating pilot signals in frequency rotation in the same sequence as in normal recording and reproduction. The invented arrangement thus dispenses with such arrangements as a time counting circuit and a last track detection signal generating circuit that have been indispensable for jointed recording by the conventional VTR's.

What is claimed is:

1. A recording apparatus arranged to form a recording track on a recording medium by recording an information signal on said recording medium, comprising:
   (A) control signal generating means for selectively generating a first control signal for causing a first tracking state during reproduction, and a second control signal for causing a second tracking state different from said first tracking state during reproduction;
   (B) recording means for forming the recording track on said recording medium by multiplexing either of said first control signal and said second control signal produced by said control signal generating means with said information signal and recording the multiplexed signal on said recording medium;
   (C) stop instruction signal generating means for outputting a stop instruction signal to instruct a stop of the recording track forming operation; and (D) control means arranged to change over said control signal generating means so that said control signal generating means outputs said second control signal, depending upon a timing of output of the stop instruction signal from said stop instruction signal generating means, in case where said stop instruction signal is outputted from said stop instruction signal generating means when said first control signal is being outputted from said control signal generating means, and to feed a stop control signal for stopping the recording track forming operation of said recording means after said second control signal has been outputted from said control signal generating means for a predetermined period.

2. A recording apparatus arranged to form a recording track on a recording medium by recording an information signal on said recording medium, comprising:
 (A) control signal generating means for selectively generating a first control signal for causing a first tracking state during reproduction and a second control signal for producing a tracking error with respect to the first tracking state;
 (B) recording means for forming a recording track on said recording medium by multiplexing either of the first control signal and the second control signal outputted from said control signal generating means with the information signal and recording the multiplexed signal onto said recording medium;
 (C) stop instruction signal generating means for outputting a stop instruction signal for instructing a stop of the recording track forming operation; and
 (D) control means arranged to change over said control signal generating means so that said control signal generating means outputs said second control signal, depending upon a timing of output of the stop instruction signal from said stop instruction signal generating means, in case where said stop instruction signal is outputted from said stop instruction signal generating means when said first control signal is being outputted from said control signal generating means, and to feed a stop control signal for stopping the recording track forming operation of said recording means after said second control signal has been outputted from said control signal generating means for a predetermined period.

3. A recording apparatus arranged to form a recording track on a recording medium, by recording an information signal on said recording medium, comprising:
 (A) control signal generating means for selectively generating a first control signal for causing a first tracking state during reproduction, and a second control signal for causing a second tracking state different from said first tracking state during reproduction;
 (B) recording means for forming the recording track on said recording medium by multiplexing said first control signal or said second control signal outputted from said control signal generating means with said information signal and recording the multiplexed signal on said recording medium and for generating a rectangular wave signal synchronizing with the recording track forming operation;
 (C) stop instruction signal generating means for outputting a stop instruction signal for instructing a stop of the recording track forming operation; and
 (D) control means arranged to change over said control signal generating means so that said control signal generating means outputs said second control signal, depending upon a timing of output of the stop instruction signal from said stop instruction signal generating means, in case where said stop instruction signal is outputted from said stop instruction signal generating means when said first control signal is being outputted from said control signal generating means and to feed a stop control signal for stopping the recording track forming operation of said recording means when an edge portion of the waveform of said rectangular wave signal is detected after said second control signal has been outputted from said control signal generating means for a predetermined period.

4. A recording apparatus arranged to form a recording track in a recording medium by recording an information signal on said recording medium, comprising;
 (A) control signal generating means for selectively generating a first control signal for causing a first tracking state during reproduction, and a second control signal for causing a second tracking state different from said first tracking state during reproduction;
 (B) recording means for forming the recording track on said recording medium by multiplexing either of said first control signal and said second control signal produced by said control signal generating means with said information signal and recording the multiplexed signal on said recording medium;
 (C) stop instruction signal generating means for outputting a stop instruction signal to instruct a stop of the recording track forming operation;
 (D) control means arranged to change over said control signal generating means so that said control signal generating means outputs said second control signal, depending upon a timing of output of the stop instruction signal from said stop instruction signal generating means, in case where said stop instruction signal is outputted from said stop instruction signal generating means when said first control signal is being outputted from said control signal generating means, and to feed a stop control signal for stopping the recording track forming operation of said recording means after said second control signal has been outputted from said control signal generating means for a predetermined period;
 (E) reproducing means for reproducing the recording track formed on said recording medium by said recording means;
 (F) tracking error signal generating means for generating a tracking error signal by using either of the first control signal and the second control signal reproduced by said reproducing means; and
 (G) detecting means arranged to monitor the tracking error signal produced by said tracking error signal generating means for detecting occurrence of an abnormality of said tracking error signal, and instructing a start of the recording track forming operation to said recording means in response to the detected result 5. A recording apparatus arranged to form a recording track on a recording medium by recording an information signal on said recording medium, comprising:

(A) synchronizing signal generating means for generating a synchronizing signal synchronizing with a recording track forming operation;

(B) pilot signal generating means for forming a plurality of kinds of pilot signals having different frequencies from each other, in a sequence to a predetermined generation pattern in synchronism with the synchronizing signal generated by said synchronizing signal gernerating means or in a sequence in contravention of said predetermined generation pattern;

(C) recording means for forming a recording track on said recording medium by multiplexing said pilot signals outputted from said pilot signal generating means with the information signal and recording the multiplexed signal onto said recording medium;

(D) stop instruction signal generating means for generating a stop instruction signal for instructing a stop of the recording track forming operation; and (E) control means arranged to change over said pilot signal generating means so that said pilot signal generating means for generating the pilot signals outputs the pilot signals in the sequence in contravention of said predetermined generation pettern, depending upon a timing of output of the stop instruction signal from said stop instruction signal generating means, in case where the stop instruction signal is outputted from said stop instruction signal generating means when said pilot signals being outputted from said pilot signal generating means in the sequence according to said predetermined generation pattern, and to feed a stop control signal for stopping the recording track forming operation to said recording means after the pilot signals have been outputted from said pilot signal generating means in the sequence in contravention of said predetermined generation pattern for a predetermined period.

6. A recording apparatus arranged to form a recording track on a recording medium by recording an information signal on said recording medium, comprising:)

(A) control signal generating means for selectively generating a first control signal for causing a first tracking state during reproduction, and a second control signal for causing a second tracking state different from said first tracking state during reproduction;

(B) recording means for forming the recording track on said recording medium by multiplexing either of said first control signal and said second control signal produced by said control signal generating means with said information signal and recording the multiplexed signal on said recording medium;

(C) synchronizing signal generating means for generating a rectangular wave signal synchronizing with the recording track forming operation of said recording means;

(D) stop instruction signal generating means for outputting a stop instruction signal to instruct a stop of the recording track forming oeration;

(E) timing signal generating means for generating a timing signal synchronized with an edge portion of the waveform of said rectangular wave signal generated by said synchronizing signal generating means after said stop instruction signal has been generated by said stop instruction signal generating means; and (F) control means arranged to changeover said control signal generating means so that said control signal generating means outputs said second control signal, depending upon a timing of output of the stop instruction signal from said stop instruction signal generating means, in case where said stop instruction signal is outputted from said stop instruction signal generating means when said first control signal is being outputted from said control signal generating means, and to feed a stop control signal for stopping the recording track forming operation of said recording means until said timing signal is generated from said timing signal generating means after said second control signal has been outputted from said control signal generating means.

7. A recording apparatus arranged to form a recording track on a recording medium by recording an information signal on said recording medium, comprising:

(A) control signal generating means for selectively generating a first control signal for causing a first tracking state during reproduction, and a second control signal for causing a second tracking state different from said first tracking state during reproduction;

(B) recording means for forming the recording track on said recording medium by multiplexing either of said first control signal and said second control signal produced by said control signal generating means with said information signal and recording the multiplexed signal on said recording medium;

(C) stop instruction signal generating means for outputting a stop instruction signal to instruct a stop of the recording track forming operation;

(D) control means arranged to changeover said control signal generating means so that said control signal generating means outputs said second control signal, depending upon a timing of output of the stop instruction signal from said stop instruction signal generating means, in case where said stop instruction signal is outputted from said stop instruction signal generating means when said first control signal is being outputted from said control signal generating means, and to feed a stop control signal for stopping the recording track forming operation of said recording after said second control signal has been outputted from said control signal generating means for a predetermined period;

(E) reproducing means for reproducing the recording track formed on said recording medium by said recording means;

(F) tracking error signal generating means for generating a tracking error signal by using either of the first control signal and the second control signal reproduced by said reproducing means; and (G) detecting means arranged to monitor the tracking error signal produced by said tracking error signal generating means for detecting occurrence of an abnormality of said tracking error signal, and instructing a start of the recording track forming operation to said recording means in response to the detected result.

8. A recording apparatus arranged to form a recording track on a recording medium by recording an information signal on said recording medium, comprising:

(A) synchronizing signal generating means for generating a synchronizing signal synchronized with a recording track forming operation;

(B) control signal generating means for forming a first control signal by generating a plurality of types of pilot signals having different frequencies from each other, in a sequence according to a predetermined generation pattern in synchronism with the synchronizing signal generated by said synchronizing signal generating means, for causing a first tracking state during reproduction and a second control signal for producing a tracking error with respect to the first tracking state, and selectively outputting the first control signal and the second control signal;

(C) recording means for forming a recording track on sadi recording medium by multiplexing either of the first control signal and the second control signal outputted from said control signal generating means with the information signal and recording the multiplexed signal onto said recording medium;

(D) stop instruction signal generating means for outputting a stop instruction signal for instructing a stop of the recording track forming operation; and (E) control means arranged to chageover said control signal generating means so that said control signal generating means outputs said second control signal, depending upon a timing of output of the stop instruction signal from said stop instruction signal generating means, in case where said stop instruction signal is outputted from said stop instruction signal generating means when said first control signal is outputted from said control signal generating means, and to feed a stop control signal for stopping the recording track forming operation of said recording means after said second control signal has been outputted from sadi control signal generating means for a predetermined period.

9. A recording apparatus according to claim 8, wherein said control means is arranged to control said control signal generating means so that a pilot signal is generated from said control signal generating means in the sequence in contravention of said predetermined generation pattern, depending upon a timing of output of the stop instruction signal from said stop instruction signal generating means.

* * * * *